United States Patent [19]

Moisset et al.

[11] 4,333,766

[45] Jun. 8, 1982

[54] CALCIUM PROCESS FOR MANUFACTURING SILICATE AND/OR ALUMINATE BASED PRODUCTS

[75] Inventors: Jacques Moisset, Fourqueux; Claude Bonet, Saint-Cyr en Val; Alain Rouanet, Font-Romeu; Alain Petit; Robert Delmas, both of Mont-Louis, all of France

[73] Assignee: Lafarge, Paris, France

[21] Appl. No.: 188,504

[22] Filed: Sep. 18, 1980

[30] Foreign Application Priority Data

Sep. 24, 1979 [FR] France ................................ 79 23737

[51] Int. Cl.³ ............................................... C04B 7/02
[52] U.S. Cl. ..................................... 106/100; 432/13; 432/14; 432/18
[58] Field of Search ..................... 106/100; 432/13, 14, 432/18

[56] References Cited

U.S. PATENT DOCUMENTS 4,126,471 11/1978 Herchenbach et al. ............. 106/100
4,191,586 3/1980 Dambrine ............................ 106/100

Primary Examiner—James Poer

Attorney, Agent, or Firm—Frost & Jacobs

[57] ABSTRACT

A process for manufacturing calcium silicate and/or aluminate based products, such as Portland cement or aluminous cements. The raw material subjected to a first heating step in which it is heated in a preheater-decarbonator and/or a rotating kiln to a temperature less than that at which impurities, such as alkalines, chlorine and sulfur, are volatized. The heated raw material is then subjected to a second heating step in the presence of a reducing gas, preferably in a plasma furnace, the raw material being heated to a temperature higher than the temperature at which the impurities are volatilized, as for example above 1950° C., and more than 80% of the material is in fusion, whereupon the material is cooled to produce the clinkers of improved quality and/or with lower energy consumption. An important feature of the invention is the utilization of the gases generated during the second heating step and during cooling to implement heating of the raw material. It is equally important, however, that the gases generated during the second heating step are not utilized to heat the raw materials unless such gases are first purified.

14 Claims, 7 Drawing Figures

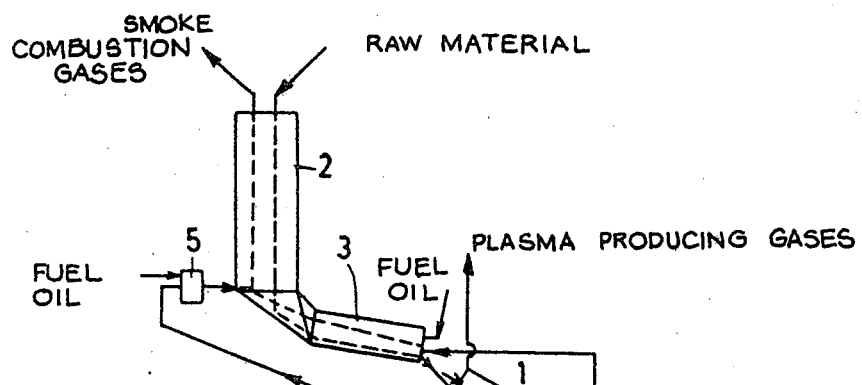
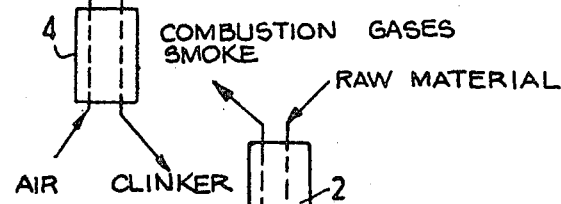
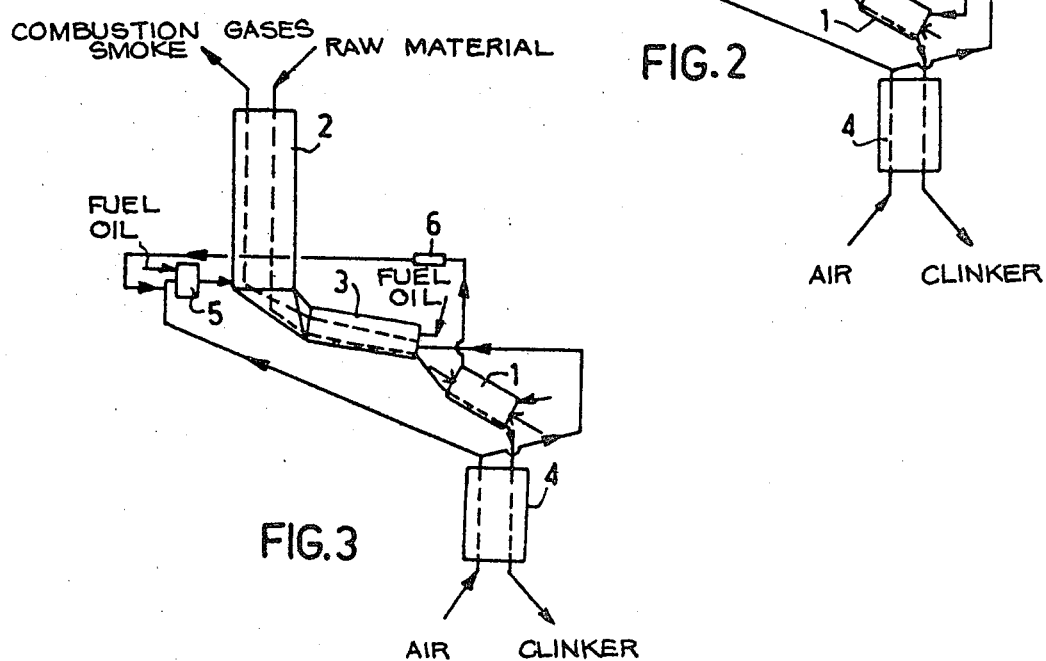

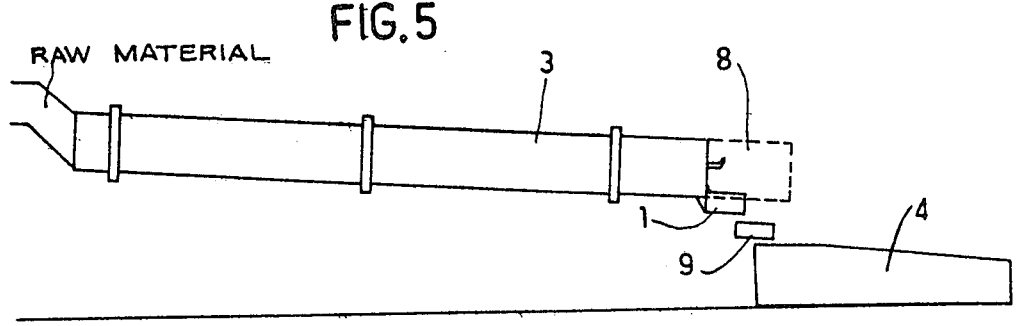
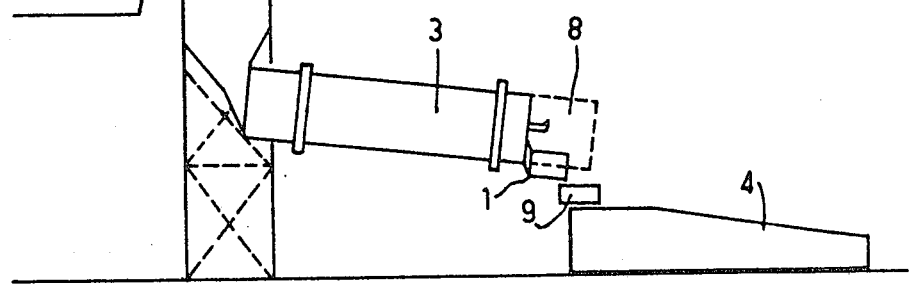
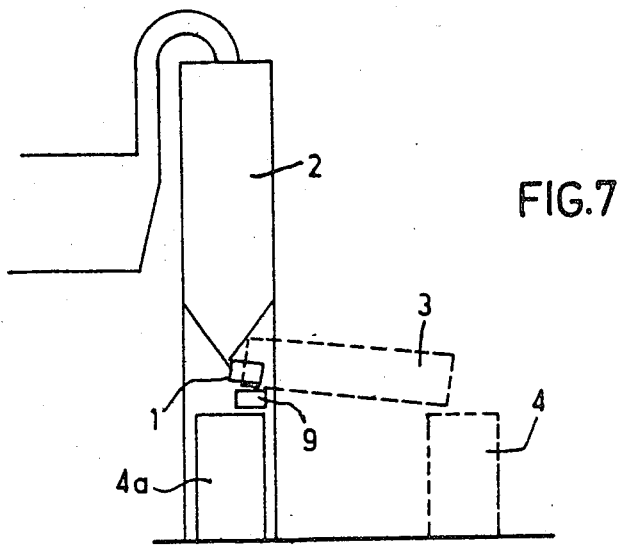

4,333,766

CALCIUM PROCESS FOR MANUFACTURING SILICATE AND/OR ALUMINATE BASED PRODUCTS

FIELD OF THE INVENTION

The present invention relates to an industrial process for manufacturing Portland cement, aluminous cement or products containing a high proportion of dicalcium silicates or calcium metasilicates and a plant for carrying out such a process.

BACKGROUND OF THE INVENTION

In the conventional process for manufacturing clinker for Portland or aluminuous cement or products containing a high proportion of dicalcium silicates or calcium metasilicates the raw material containing calcium carbonate is heated during a first stage up to a temperature of the order of 900° C. to decarbonate it. In the case of manufacturing Portland cement the decarbonated raw material is subjected to a second stage at a temperature of the order of 1500° C. in a kiln, generally a rotary kiln, where it is clinkered and a part, but only a part, of the raw material is melted. In the case of aluminous or calcium metasilicate cements all of the product is calcined and also may be fused, as is the case with cement fondu or metacalcium silicate (French Pat. No. 1,584,873). In the case of conventional manufacture of Portland cement it is known that when using raw materials containing impurities such as alkalines, e.g., sodium, potassium, chlorine, phosphorus or sulfur, these impurities are found to a great extent in the calcined product which is detrimental to the latter's quality. These impurities are partially volatilized in the hot parts of the kiln but in normal conventional processes the raw meal is decarbonated while in conterflow with the hot gases emanating from the calcining, clinkering or melting kiln and are charged with these volatile components. The latter to a great extent condense on the cold raw material and are recycled. A closed circuit thus results in which the impurities only escape with the treated product and which may in addition lead to various disturbances such as the closing off the gas flue or even the kiln itself.

The effects of these recyclings may be reduced by establishing gas blowoffs but this entails an increase in fuel consumption and only has a limited effect on the content of impurities in the final product.

Laboratory test, cf. the article by F. P. Glasser in "Cement and Concrete Research", Vol. 5, 1975, pp.55–61, have shown that a plasma oven treatment for Portland cement raw mixture results in a decrease of at least 0.05% of the potassium content, but at the price of a large increase in the consumption of energy and without markedly improving the technical properties of the resultant cement. In most cases there is even a deterioration in these properties as a result of the presence of variable but often considerable quantities of vitreous phases.

Various technological improvements have, however, been made in plasma ovens. It is reasonable to hope that energy consumptions less than those of conventional kilns can be obtained.

Among the solutions put forward to reduce the consumption of energy besides those which concern the structure of the plasma oven itself, it has been proposed to use a raw material containing carbon; which is converted into CO in the oven and the CO produced is carried to a plant where it is burned to produce the electricity for feeding the plasma oven. Such a solution is ingenious but its overall energy efficiency is low. More simply the gas products may be carried to a chamber of a heat exchanger, the other chamber of the heat exchanger serving to preheat the raw material. Such a solution requires large investments without being perfect from the standpoint of efficiency and is therefore inferior to direct heating of the raw material by contact with the exiting gases; but with direct heating one is once again faced with the impurities recycling problem explained above.

SUMMARY OF THE INVENTION

An object of the invention is to obviate the foregoing drawbacks and to provide a cement clinker which has most of its volatile impurities removed, the result being obtained with a low consumption of energy, comparable to or less than that of conventional processes for preparing clinker, owing to the small volume of plasma-producing gas compared with the volume of combustion-supporting gas necessary for burning an organic fuel.

The invention relates to a process for manufacturing clinker containing a proportion greater than 50% of one of the following products: tricalcium silicate, dicalcium silicate, calcium metasilicate, monocalcium aluminate and slags, wherein during a first stage a solid raw material containing calcium carbonate is heated to an elevated temperature sufficient to decarbonate the calcium carbonate, the heating being obtained at least in part by the medium of hot gases in direct counterflow contact with the raw material. During a second stage heating step the initially heated raw material is heated to a still higher temperature in the presence of a reducing gas, and in a third stage cooling step the heated material is cooled, the hot gases produced during the third stage being carried over the raw material for heating it during the first stage heating step without passing through the enclosure where the second stage heating step is carried out. The gases used during the second stage heating step are not permitted to come in contact with the raw material during the first stage heating step unless first purified, characterised in that during the second stage heating step the raw material is heated to a temperature greater than 1500° C. so as to obtain the fusion of more than 80% of the material.

According to an advantageous embodiment a plasma furnace is used for the second stage heating step and the gases leaving the second stage furnace are used at least in part as the plasma-producing gases in the plasma furnace.

It must, however, be observed that the plasma furnace may be replaced by another kind of furnace or kiln provided that it is sufficiently powerful to heat the products to the elevated temperatures necessary, with a gas flow rate as small as possible. For example, oxygen flame ovens, electric arc ovens, etc. may be used. Special mention must be made here of radiation ovens such a solar ovens. This excludes, on the other hand, magnetohydrodynamic generators such as taught in German Pat. No. 2,130,590 which employs a slightly ionized gas called "plasma gas" but does not enable the fusion of the product to be achieved.

It has been found advantageous to use a plasma furnace whose graphite electrodes are provided with a coating which protects them against oxidation, e.g., a silicon or copper carbide coating. In this way it is possible to operate in an oxidizing atmosphere without consumption of the electrodes by oxidation or at the very least a consumption of the electrodes held within acceptable limits. Considerable savings may thus be realized by replacing argon as the plasma-producing gas by a more common gas, such as air, smoke or $CO_2$.

In industrial practice it is advisable to use in the second stage a rotary kiln having its axis at an angle up to 60° in relation to the horizontal. A vertical kiln, such as the plasma kiln in which the experiments described in the above-mentioned article by F. B. Glasser were conducted attain very short residence times. Such times are suitable for small flow rates of very fine particle sizes but not a large plant.

The features of the rotary kiln, notably its angle with respect to the horizontal, are selected as a function of the required residence time and the viscosity of the liquid product which in turn depend on the nature of the product and the conditions of treatment. For Portland cement angles of 30°–40° are customarily preferred, whereas for aluminuous cement angles of 50°–60° are appropriate.

The invention will be described in greater detail by way of practical non limiting examples illustrated by the drawings.

BRIEF DESCRIPTION OF THE DRAWINGS

FIG. 1 is a schematic view of a simple installation with a plasma furnace operating according to the invention;

FIG. 2 is a view of a similar installation similar to that of FIG. 1 but further comprising recycling plasma producing gases;

FIG. 3 is a view of an installation similar to that of FIG. 1 but comprising in addition the use of plasma producing gases for preheating the raw material;

FIG. 5 is a view showing modifications of an existing long kiln brought about by adopting the process according to the invention;

FIG. 6 is a view similar to that of FIG. 5 but for a plant with a vertical exchanger; and FIG. 7 is a view similar to that of FIGS. 5 and 6 for a plant with a vertical exchanger and a precalcinator.

DETAILED DESCRIPTION OF THE PREFERRED EMBODIMENTS

Figure 4:
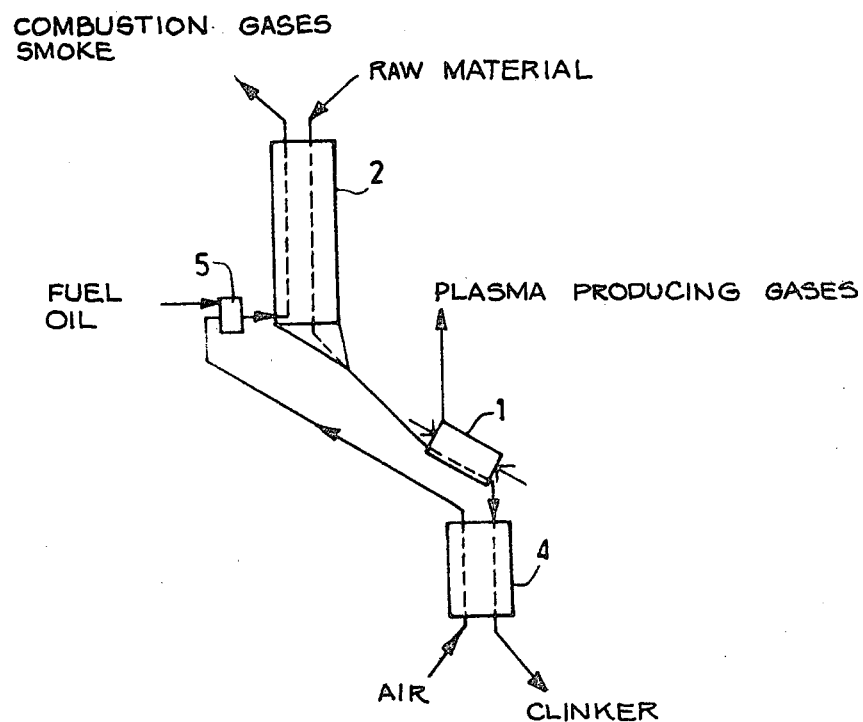
FIG. 4 is a view of an installation similar to that of FIG. 1 but having a direct supply of fuel gas from a fuel furnace to the decarbonated raw material plasma furnace.

The essential element of the installations described hereinafter by way of example is an elevated temperature operating kiln, typically a rotary fusion kiln 1 the axis of rotation of which is at an angle of 3°–60° with respect to the horizontal, heated by plasma which is preferably of the ANVAR-FOEX type with drawn plasma firing or three-phase plasma firing.

This kiln may be supplied with decarbonated raw material or already fused products. The function of this kiln is to heat to total fusion, at a temperature greater than 1800° C. or even 1950° C. depending on the product treated, the decarbonated raw material or clinker preroasted in another apparatus. It thus provides a totally fused product which is free of a large part of its impurities with a consumption of electricity which is one-fifth or one-tenth of that of the processes of fusion already described.

FIG. 1 illustrates a basic schematic showing of an installation which comprises, in the order of the passage of the product therethrough, a raw meal preheater-decarbonator 2, a rotary kiln 3, a fusion furnace 1 and a clinker cooler 4. Contrary to conventional plants, the gases do not transport the products of combustion in the entire plant in counterflow, but pass from the cooler 4 to the rotary kiln 3 and to the preheater-decarbonator 2 while avoiding the fusion furnace 1. At the exit of the cooler 4 the heated air in contact with the clinker is partly conveyed to the rotary kiln where it supports the combustion of the fuel oil burner and partly to the furnace 5 for heating the preheater-decarbonator 2. As indicated in FIG. 1 the plasma-producing gases leaving the fusion furnace 1 and which represent a volume less than 0.150 $Nm^3/Kwh$, and which may be as little as 0.08 $Nm^3/Kwh$, are exhausted to the atmosphere, the exhaust gases entraining practically all the volatilized impurities but releasing much less energy (as little as one-sixth) than in the case of blowoffs of combustion gases, as is the case in conventional processes of manufacturing clinker for Portland cement.

In FIG. 2 a modified embodiment is illustrated wherein the plasma-producing gases are recycled in the fusion furnace 1 after passing through a condenser 6 where the impurities are separated out.

In FIG. 3 another modified embodiment of the process is represented in which, after passing through the condenser 6, the plasma-producing gases, which are still carrying substantial heat, are fed to the furnace 5 for preheater-decarbonater 2 and then are discharged.

It is obvious that the choice between these two alternatives depends on the relationship of the cost of electrical energy used in the fusion furnace 1 and that of the fuel oil used in the furnace 5.

FIG. 4 illustrates the direct supply of decarbonated raw material to fusion furnace 1. In this case the gases leaving the cooler 4 are all conveyed to the furnace 5. This arrangement permits the elimination of the rotary kiln.

The arrangement of FIG. 4 may be combined with that of FIG. 2 which comprises a recycling of the plasma-producing gases (exiting fusion furnace 1) through a condenser 6, and with that of FIG. 3, the plasma-producing gases leaving the fusion furnace 1 then being returned through the condenser into the preheater-decarbonator 2. The choice among the various solutions illustrated by the drawings is a function of numerous factors among which, as mentioned above, is the relationship between the cost of fuel oil with that of electricity.

An advantage of the process according to the invention resides in the fact that since there is no flow of gas between the clinker cooler and the high temperature furnace, whether or not it is a plasma furnace, it is easier to achieve very rapid cooling. Another feature of the process according to the invention is to permit the use of a heat source with which very high temperatures may be attained, markedly greater than the melting point of the materials, without a prohibitive increase in the consumption of energy.

There are various ways of affecting the ultimate properties of the clinker by modifying the cooling mode: if the product is heated to the liquid state a choice may be made between slow cooling by casting in ingot molds or rapid cooling by air or water quenching. It is known that rapid cooling or very rapid cooling increases the free lime content and reduces the aluminoferrite content for products containing lime, aluminum oxides and iron oxides. It is therefore possible to adjust the setting time or the long term strength of the processed material.

By way of example, Portland cement strengths (in MPa) of cement test pieces prepared from pure paste with an E/C ratio (water/cement by weight) of 0.5:

A represents a reference test sample.

B a cement produced from the same clinker melted in a plasma furnace and water-quenched.

C the same cement as B but air-quenched.

D the same cement as B and C but slowly cooled.

E a cement produced from the same raw meal as the preceding cements, this raw meal being heated directly in the plasma furnace then water-quenched.

| | Compressive - Tensile - Strength in MegaPascals After | | |
|---|---|---|---|
| | 1 day | 7 days | 28 days |
| A | 4 | 24 | 40 |
| B | 4.5 | 26 | 44 |
| C | 4 | 23.5 | 50 |
| D | 6.5 | 35 | 53 |
| E | 8 | 28.5 | 58 |

The process according to the invention permits the volatile impurities content of the resultant clinker to be sharply reduced.

Hereinbelow are given by way of example analyses obtained.

The treatment of industrial raw material for the trial manufacture of cement described above was carried out using argon as the plasma-producing gas. Other trials have been carried out with similar results using air or even combustion gases (smoke), in which event the electrodes of the plasma furnace are made of graphite and coated with silicon or copper carbide. $CO_2$ has also been successfully employed in refractory oxide fusion tests.

| | Plant raw material | Fused and water-quenched raw meal. |
|---|---|---|
| Insoluble material | 23.20 | 0.05 |
| $SiO_2$ | | 23.10 |
| $Al_2O_3$ | 4.65 | 4.65 |
| $Fe_2O_3$ | 2.90 | 2.40 |
| FeO | | 0.10 |
| CaO | 66.50 | 66.85 |
| MgO | 1.40 | 1.50 |
| $SO_3$ | | 0.05 |
| $CO_2$ | 0.48 | 0.25 |
| Water-MV | | 0.40 |
| total $K_2O$ | 0.72 | 0.11 |
| Total $Na_2O$ | 0.15 | 0.05 |
| Total | 100 | 99.51 |
| free CaO | — | 1.55 | in the case of the treatment of industrial clinker

| | Industrial clinker | Clinker treated and water-quenched | Clinker treated and air-quenched |
|---|---|---|---|
| Insoluble materials | 0.35 | 0.20 | 0.15 |
| $SiO_2$ | 21.65 | 22.45 | 22.30 |
| $Al_2O_3$ | 4.90 | 5.15 | 5.25 |
| $Fe_2O_3$ | 3.15 | 3.18 | 3.35 |
| FeO | 0.10 | 0.18 | 0.06 |
| MgO | 1.75 | 1.40 | 1.50 |
| CaO | 66.00 | 66.50 | 66.46 |
| free lime | 0.15 | 0.60 | 0.45 |
| $SO_3$ | 0.75 | 0.10 | 0.15 |
| Total $K_2O$ | 0.70 | 0.18 | 0.20 |
| Total $Na_2O$ | 0.50 | 0.06 | 0.13 |
| Soluble $K_2O$ | 0.59 | 0.01 | 0.05 |
| Soluble $Na_2O$ | 0.07 | 0.01 | 0.08 |

FIGS. 5-7 show the conversion of three types of pre-existing plants by adapting them to the process according to the invention. FIG. 5 illustrates a "long kiln" type of installation in which the raw material is fed directly into the rotary kiln 3. The conversion of this type of plant consists of removing the end 8, which is the hottest end, of the kiln 3 and providing a plasma furnace 1 in its place followed, if desired, by a grinder 9 which discharges the product into the cooler 4 which is retained. The hot gases leaving the cooler are carried directly into the rotary kiln in accordance with the schematic representations of FIGS. 1-4.

FIG. 6 shows an installation with a vertical preheater-decarbonator 2 and a rotary kiln 3. The conversion again essentially comprises removing the hottest end of the kiln 3 and replacing it by a plasma furnace 1 and optionally a grinder 9 for the fused product.

FIG. 7 shows an installation with a vertical preheater-decarbonator 2 and a shorter rotary kiln 3. In this case the conversion consists of completely removing the rotary kiln 3, the plasma furnace 1 and the optional grinder, due to their small dimensions, being placed under the precalcinator and the cooler 4 may be arranged at 4a subjacent thereto which provides a particularly compact unit.

The same installations permit the manufacture of products having as a base dicalcium silicate, calcium metasilicate, or monocalcium aluminate. With the last two products certain processes result in fusion and the product is cast in an ingot mold or granulated. The novel process according to the invention offers the possibility of quickly obtaining high temperatures which reduce the viscosity of the product and thus facilitates the pouring of the product while very greatly reducing the losses through the walls and smoke (combustion gases) compared to conventional processes in which these losses are increased by the fact that the required temperatures are at the limit of what may be attained by burning fossil fuels in air. The invention thus permits a considerable reduction in energy consumption in the form of heat in the manufacture of such products. This reduction is unexpected because it coincides with a increase of the maximum temperatures. It may attain 2,400 KJ/kg, or 33%, in the case of aluminous cements and up to 14,000 KJ/kg or 85%, in the case of manufacturing calcium metasilicate by fusion.

What is claimed is:

1. A process for manufacturing clinker containing more than 50% by weight of a raw material selected from the group consisting of tricalcium silicate, dicalcium silicate, calcium metasilicate, monocalcium aluminate, and slags, said process comprising the steps of:

(a) heating in a first enclosure a solid raw material containing calcium carbonate to an elevated temperature sufficient to decarbonate the calcium carbonate, including the step of bringing hot gases into direct counterflow contact with the raw material;

(b) further heating the raw material in a second enclosure in the presence of a reducing gas to a temperature greater than 1500° C. so as to obtain fusion of more than 80% of the raw material, including the step of maintaining impurity containing hot gases generated during said further heating step out of contact with the raw material during step (a); and (c) cooling said further heated raw material and conveying the hot gases produced during cooling of said raw material for use in step (a), said gases being conveyed to said first enclosure without passing through said second enclosure in which step (b) is carried out.

2. The process according to claim 1, wherein said raw material is heated in step (b) to a temperature greater than 1800° C.

3. The process according to claim 1, wherein the raw material is heated in step (b) to a temperature greater than 1950° C.

4. The process according to claim 1 comprising carrying out step (b) in a plasma furnace, with the raw material passing through the plasma furnace, the gases produced in the plasma furnace entraining impurities volatilized during heating.

5. The process according to claim 4 wherein the plasma furnace comprises a rotary kiln with its axis at an angle of 3° to 60° with respect to the horizontal.

6. The process according to claim 4, wherein said hot gases employed during step (b) are used partly as plasma-producing gases in the plasma furnace.

7. The process according to claim 1, wherein step (c) comprises air-quenching the molten product.

8. The process according to claim 1, wherein step (c) comprises water-quenching the molten product.

9. The process according to claim 1, wherein step (c) comprises rapid cooling the molten product.

10. The process according to claim 1, wherein step (c) comprises slow cooling the molten product in an ingot mold.

11. The process according to claim 4, further comprising recycling the hot gases from step (b) after condensation of the impurities volatilized during step (b).

12. The process according to claim 1, further comprising conveying the hot gases produced during step (b) for use in step (a) after separating by condensation the impurities volatilized during step (b).

13. The process according to claim 4 wherein the plasma-producing gas used in the plasma furnace is an oxidizing gas, wherein the plasma furnace includes electrodes, and wherein said electrodes for the plasma furnace are made of graphite with an antioxidation protective coating.

14. The process according to claim 13, wherein said antioxidation coating is selected from a group consisting of silicon carbide and copper carbide.

* * * * *